United States Patent
Ito et al.

(10) Patent No.: US 12,503,362 B2
(45) Date of Patent: Dec. 23, 2025

(54) HYDROGEN RELEASE AND STORAGE SYSTEM, HYDROGEN RELEASE AND STORAGE METHOD, AMMONIA PRODUCTION APPARATUS, GAS TURBINE, FUEL CELL, AND STEEL MILL

(71) Applicant: MITSUBISHI HEAVY INDUSTRIES, LTD., Tokyo (JP)

(72) Inventors: Hideki Ito, Tokyo (JP); Shuntaro Seto, Tokyo (JP); Wataru Matsubara, Tokyo (JP); Keiichi Nakagawa, Tokyo (JP); Akio Sato, Tokyo (JP); Takashi Yoshimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 557 days.

(21) Appl. No.: 17/917,867

(22) PCT Filed: Mar. 22, 2021

(86) PCT No.: PCT/JP2021/011681
§ 371 (c)(1),
(2) Date: Oct. 7, 2022

(87) PCT Pub. No.: WO2021/210351
PCT Pub. Date: Oct. 21, 2021

(65) Prior Publication Data
US 2023/0141693 A1 May 11, 2023

(30) Foreign Application Priority Data
Apr. 13, 2020 (JP) .................................. 2020-071758

(51) Int. Cl.
*C01B 3/06* (2006.01)
*C01C 1/04* (2006.01)
(Continued)

(52) U.S. Cl.
CPC ............ *C01B 3/068* (2013.01); *C01C 1/0447* (2013.01); *C21B 13/0073* (2013.01); *F02C 6/14* (2013.01);
(Continued)

(58) Field of Classification Search
None
See application file for complete search history.

(56) References Cited

U.S. PATENT DOCUMENTS

2002/0025462 A1    2/2002  Nakanishi et al.
2005/0132640 A1*   6/2005  Kelly .................... C01B 3/065
                                                     44/301
(Continued)

FOREIGN PATENT DOCUMENTS

CN        101880046 A    11/2010
CN        110106512 A    8/2019
(Continued)

OTHER PUBLICATIONS

Certified Foreign Priority JP 2020-168605 for Hikita et al US 2022/0105488 (Year: 2020).*

(Continued)

*Primary Examiner* — Colin W. Slifka
(74) *Attorney, Agent, or Firm* — Birch, Stewart, Kolasch & Birch, LLP (57) ABSTRACT

A hydrogen release and storage system (100) of the present invention includes a hydrogen compound member (101), a container (102) that accommodates the hydrogen compound member (101), a heating apparatus (103) configured to heat the inside of the container (102), a cooling apparatus (104) configured to cool the inside of the container (102) and a water supply apparatus (105) configured to supply water to the container (102).

9 Claims, 9 Drawing Sheets

(51) Int. Cl.
  *C21B 13/00* (2006.01)
  *F02C 6/14* (2006.01)
  *H01M 8/04082* (2016.01)
  *H01M 8/12* (2016.01)

(52) U.S. Cl.
  CPC ..... *H01M 8/04216* (2013.01); *C21B 2100/62* (2017.05); *H01M 2008/1293* (2013.01)

(56) References Cited

U.S. PATENT DOCUMENTS

| | | |
|---|---|---|
| 2006/0269470 A1 | 11/2006 | Zhang et al. |
| 2012/0100062 A1 | 4/2012 | Nakamura et al. |
| 2019/0315628 A1 | 10/2019 | Kondo et al. |
| 2022/0105488 A1 | 4/2022 | Hikita et al. |

FOREIGN PATENT DOCUMENTS

| | | |
|---|---|---|
| EP | 1 170 249 A1 | 1/2002 |
| EP | 2 455 336 A1 | 5/2012 |
| EP | 3 208 877 A2 | 8/2017 |
| JP | 5-225996 A | 9/1993 |
| JP | 2002-80202 A | 3/2002 |
| JP | 2005-200245 A | 7/2005 |
| JP | 2005-298302 A | 10/2005 |
| JP | 2005-314151 A | 11/2005 |
| JP | 2006-127917 A | 5/2006 |
| JP | 2010-17700 A | 1/2010 |
| JP | 2012-206932 A | 10/2012 |
| JP | 2015-38039 A | 2/2015 |
| JP | 2016-185899 A | 10/2016 |
| JP | 2018-184340 A | 11/2018 |
| JP | 2019-98328 A | 6/2019 |
| JP | 2019-218251 A | 12/2019 |
| WO | WO 2011/007493 A1 | 1/2011 |
| WO | WO 2018/074518 A1 | 4/2018 |

OTHER PUBLICATIONS

International Search Report for International Application No. PCT/JP2021/011681, dated Jun. 1, 2021, with English translation.
Written Opinion of the International Searching Authority for International Application No. PCT/JP2021/011681, dated Jun. 1, 2021, with English translation.
Chinese Office Action and Search Report for Chinese Application No. 202180027904.1, dated Dec. 26, 2023, with English translation.
International Search Report for International Application No. PCT/JP2021/014960, dated Jun. 29, 2021, with English translation.
Jin et al., "New Energy Technology," Sinopec Press, 2nd edition, Jan. 31, 2020, 3 pages total.
U.S. Office Action for U.S. Appl. No. 17/917,716, dated May 19, 2025.
Written Opinion of the International Searching Authority for International Application No. PCT/JP2021/014960, dated Jun. 29, 2021, with English translation.

\* cited by examiner

• HYDROGEN(H)
• ELEMENT OTHER THAN HYDROGEN(X)

HYDROGEN RELEASE AND STORAGE SYSTEM, HYDROGEN RELEASE AND STORAGE METHOD, AMMONIA PRODUCTION APPARATUS, GAS TURBINE, FUEL CELL, AND STEEL MILL

TECHNICAL FIELD

The present invention relates to a hydrogen release and storage system, a hydrogen release and storage method, an ammonia production apparatus, a gas turbine, a fuel cell and a steel mill.

Priority is claimed on Japanese Patent Application No. 2020-071758, filed in Japan on Apr. 13, 2020, the content of which is incorporated herein by reference.

BACKGROUND ART

Hydrogen energy is in use in a variety of processes such as ammonia synthesis, gas combustion, the manufacture of solid oxide fuel cells and iron making. It is known that huge effort and cost are required to supply a hydrogen gas, which serves as a raw material, and there is a demand for a technique that improves the current situation. In addition, in processes where hydrogen energy is used, a large amount of exhaust heat is generated, and thus there is a demand for a method for effectively using hydrogen energy.

CITATION LIST

Patent Literature

[Patent Document 1]
PTC International Publication No. WO 2018/074518

SUMMARY OF INVENTION

Technical Problem

As a material that generates hydrogen, borohydrides are being studied. Patent Document 1 discloses a sheet containing a borohydride in a two-dimensional manner (Patent Document 1). However, when all of the hydrogen that is contained in the sheet has been generated, there is a need to supply a new sheet, and additional effort and cost as much are required.

The present invention has been made in consideration of the above-described circumstances, and an objective of the present invention is to provide a hydrogen release and storage system, a hydrogen release and storage method, an ammonia production apparatus, a gas turbine, a fuel cell and a steel mill which enable the effective use of exhaust heat and suppression of the generation of additional energy necessary for hydrogen generation.

Solution to Problem

In order to solve the above-described problem, the present invention adopts the following means.

(1) A hydrogen release and storage system according to one aspect of the present invention includes a hydrogen compound member, a container that accommodates the hydrogen compound member, a heating apparatus configured to heat an inside of the container, a cooling apparatus configured to cool the inside of the container and a water supply apparatus configured to supply water to the inside of the container.

(2) In the hydrogen release and storage system according to (1), a stoichiometric ratio between an element other than a hydrogen element that configures the hydrogen compound member and the hydrogen element is preferably 1:1 to 3:4.

(3) In the hydrogen release and storage system according to (2), an element other than hydrogen may be boron.

(4) The hydrogen release and storage system according to any one of (1) to (3) may further include a switching apparatus that switches between a first state and a second state, the first state is a state where the heating apparatus is driven and the cooling apparatus and the water supply apparatus are stopped and a second state is a state where the heating apparatus is stopped and the cooling apparatus and the water supply apparatus are driven.

(5) A hydrogen release and storage method according to one aspect of the present invention is a hydrogen release and storage method in which the hydrogen release and storage system according to any one of (1) to (4) is used as a hydrogen supply source and alternately has a hydrogen release step of heating the inside of the container so as to reach 150° C. or higher and releasing hydrogen from the hydrogen compound member and a hydrogen absorption step of supplying water to the inside of the container while cooling the inside of the container so as to reach lower than 150° C. and absorbing the hydrogen into the hydrogen compound member.

(6) An ammonia production apparatus according to one aspect of the present invention includes the hydrogen release and storage system according to any one of (1) to (4) as a hydrogen supply source.

(7) A gas turbine according to one aspect of the present invention includes the hydrogen release and storage system according to any one of (1) to (4) as a hydrogen supply source.

(8) A fuel cell according to one aspect of the present invention includes the hydrogen release and storage system according to any one of (1) to (4) as a hydrogen supply source.

(9) A steel mill according to one aspect of the present invention includes the hydrogen release and storage system according to any one of (1) to (4) as a hydrogen supply source.

Advantageous Effects of Invention

The hydrogen release and storage system of the present invention can be used as a hydrogen supply source in a variety of apparatuses in which hydrogen is used as a raw material. Furthermore, since hydrogen can be generated without newly adding energy by using exhaust heat that is generated in the apparatuses to heat the hydrogen compound member to generate hydrogen, it is possible to reduce the amount of natural gas used in association with the addition of energy.

DESCRIPTION OF EMBODIMENTS

Hereinafter, a hydrogen release and storage system according to an embodiment to which the present invention is applied will be described in detail using drawings. In some of the drawings to be used in the following description, a characteristic portion is shown in an enlarged manner for convenience in order to facilitate the understanding of the characteristic, and the dimensional ratios and the like of each configurational element are not always the same as those in actual cases. In addition, materials, dimensions, and the like to be exemplified in the following description are simply examples, and the present invention is not limited thereto and can be appropriately modified and carried out within the scope of the gist of the present invention.

Figure 1:
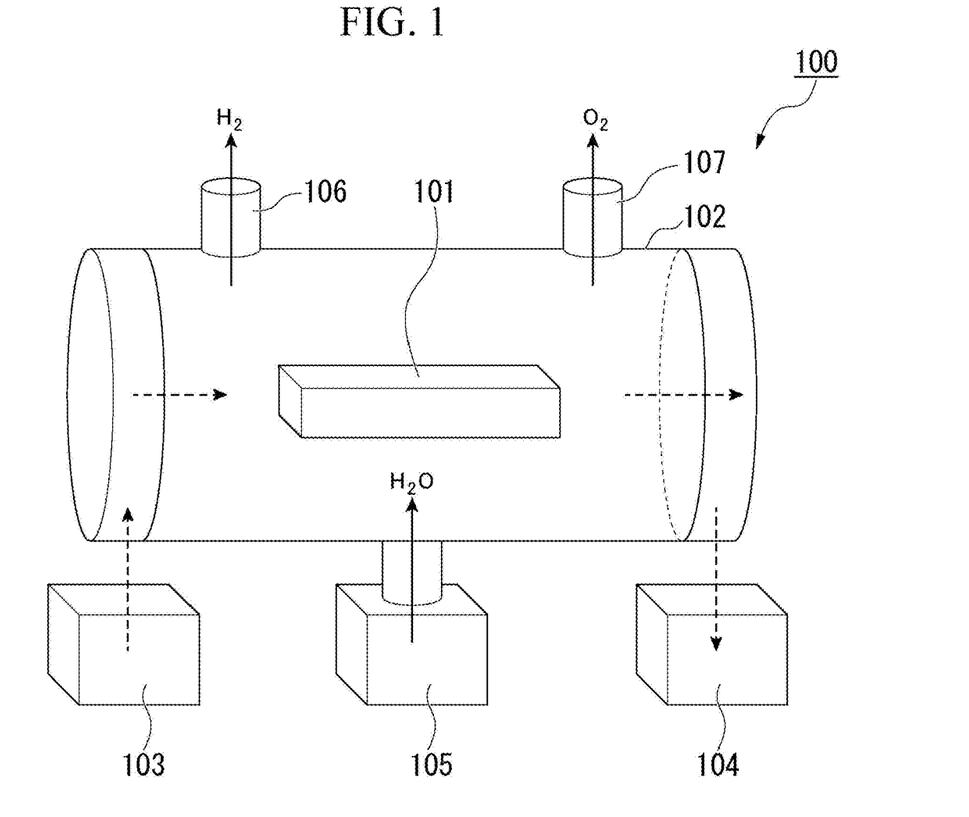
FIG. 1 is a view schematically showing the configuration of a hydrogen release and storage system according to one embodiment of the present invention.

FIG. 1 is a perspective view schematically showing the configuration of a hydrogen release and storage system 100 according to one embodiment of the present invention. The hydrogen release and storage system 100 includes a hydrogen compound member 101, a container (reaction container) 102 that accommodates the hydrogen compound member 101, a heating apparatus 103 configured to heat the inside of the container 102, a cooling apparatus 104 configured to cool the inside of the container 102 and a water supply apparatus 105 configured to supply water to the container 102.

The stoichiometric ratio between an element X other than a hydrogen element that configures the hydrogen compound member 101 and the hydrogen element H is 1:1 to 3:4 (for example, XH, $XH_2$, $XH_3$, $XH_4$, $X_2H_3$ or $X_3H_4$). Examples of an element other than hydrogen include boron B.

In the side wall portion of the container 102, a hydrogen release portion 106 that releases hydrogen generated from the hydrogen compound member 101 to the outside of the container 102 and an oxygen release portion 107 that releases oxygen that is generated from supplied water to the outside are provided apart from each other.

The heating apparatus 103 may be in direct contact with or may not be in contact with the hydrogen compound member 101 to be heated. Here, a heating apparatus that is attached to the outside of the container 102 is exemplified.

As the heating apparatus 103, a combustor, an electric heater, a steam heating apparatus and the like are exemplary examples.

The cooling apparatus 104 may be attached to the outside of the container 102 or accommodated in the container 102 as long as the hydrogen compound member 101 in the container 102 can be cooled. As the cooling apparatus 104, an air cooler, a water cooler and other refrigerant-type cooling apparatuses are exemplary examples. For cooling, the inside of the container 102 may be opened and left to stand in the atmosphere without using the cooling apparatus 104.

The water supply apparatus 105 supplies a fluid containing liquid or gaseous water as a main component to the inside of the container 102. When the temperature of the fluid becomes close to the intended cooling temperature, since it is possible to make the water to be supplied function as a refrigerant, the water supply apparatus 105 is capable of functioning as the cooling apparatus 104 as well.

The hydrogen release and storage system 100 may further include a switching apparatus (not shown) that switches between a first state where the heating apparatus 103 is driven and the cooling apparatus 104 and the water supply apparatus 105 are stopped (hydrogen release state) and a second state where the heating apparatus 103 is stopped and the cooling apparatus 104 and the water supply apparatus 105 are driven (hydrogen storage state).

Figure 2:
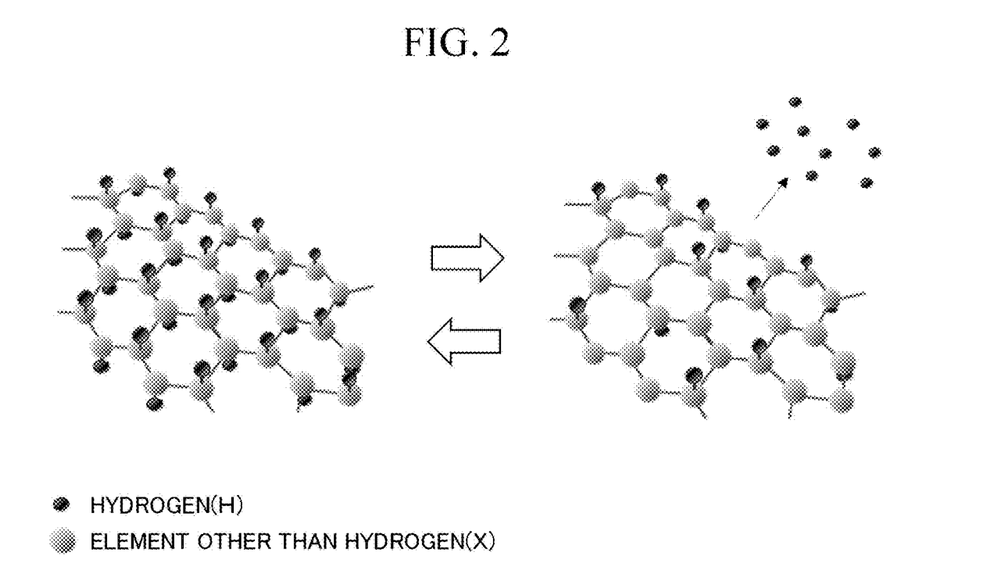
FIG. 2 is a view schematically showing the configurations of a hydrogen compound member in a hydrogen absorption state and in a hydrogen release state.

FIG. 2 is a view schematically showing the configurations of the hydrogen compound member 101 in a hydrogen absorption state (left-hand side) where hydrogen elements bond to almost all bonding sites of an X element that configures a hydrogen compound and in the hydrogen release state where no hydrogen elements bond to some of the bonding sites of the X element due to hydrogen release.

When the hydrogen release and storage system of the present embodiment is used as a hydrogen supply source, it is possible to carry out a hydrogen release and storage method in the following procedure.

(Hydrogen Release Step)

Figure 3:
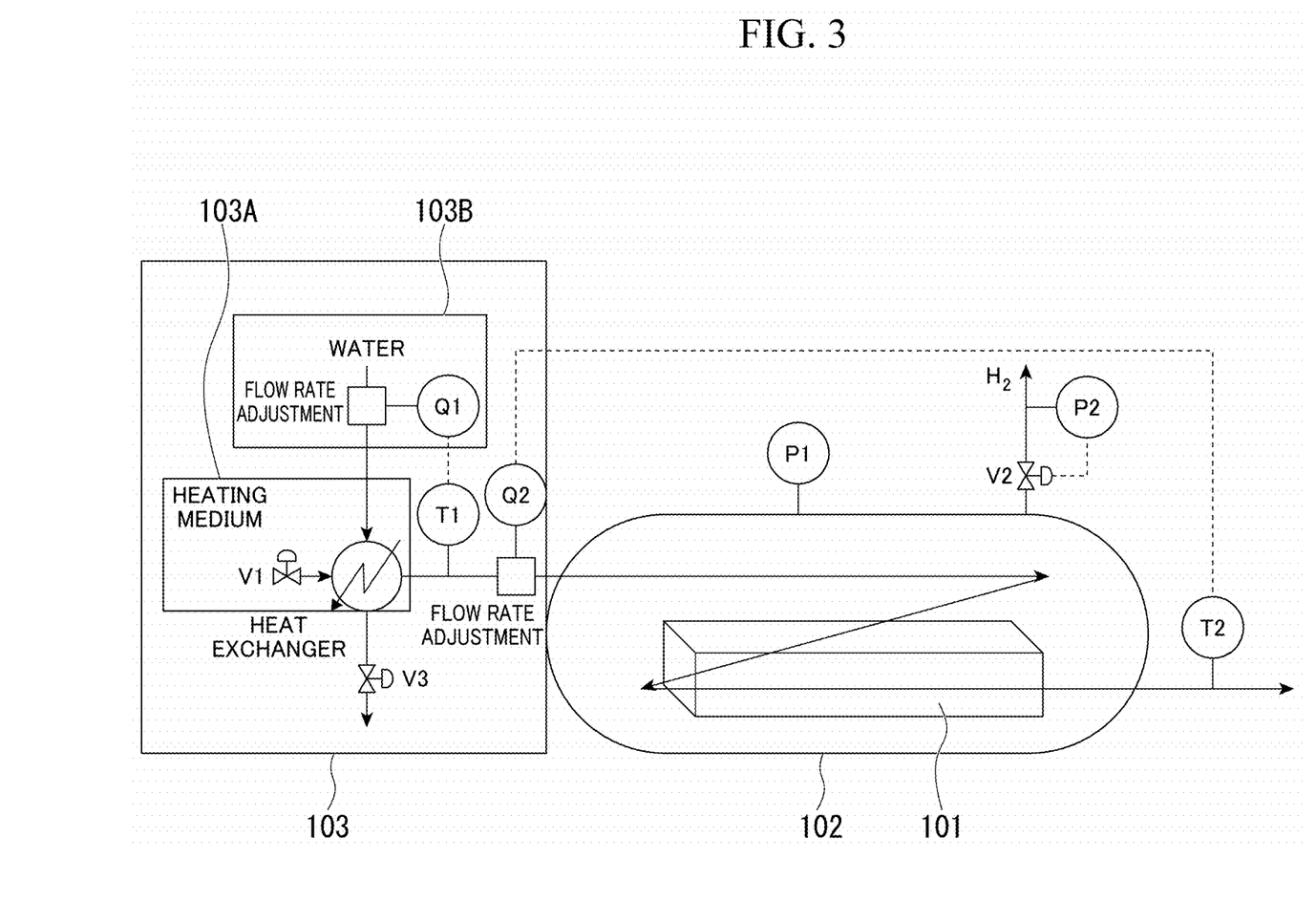
FIG. 3 is a view schematically showing the configuration of a facility that is used in a hydrogen release step in a hydrogen release and storage method according to one embodiment of the present invention.

FIG. 3 is a view schematically showing the configuration of a facility that is used in a hydrogen release step. The heating apparatus 103 is composed of means for supplying a heating medium (heating medium supply means) 103A and means for adjusting the temperature of the heating medium (temperature adjustment means) 103B. The cooling apparatus 104 and the water supply apparatus 105 that are not used in this step are not shown.

Figure 4:
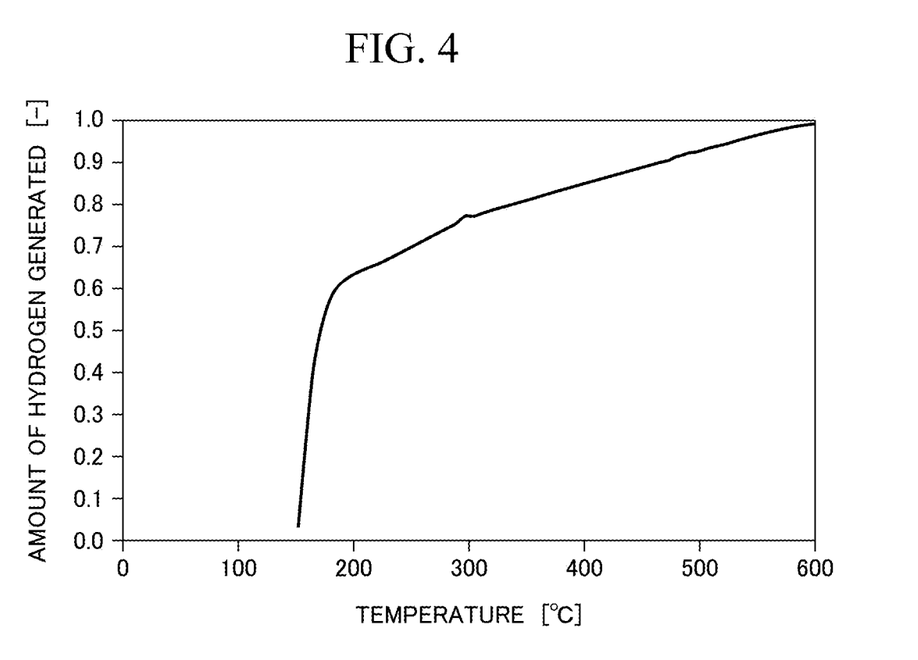
FIG. 4 is a graph showing the relationship between the temperature of the hydrogen compound member and the amount of hydrogen that is generated from the hydrogen compound member.

FIG. 4 is a graph showing the relationship between the temperature of the hydrogen compound member 101 and the amount of hydrogen that is generated from the hydrogen compound member 101 (the amount of hydrogen generated). As shown in this graph, the hydrogen compound member 101 is made to generate hydrogen at a temperature of 150° C. or higher. Therefore, first, the hydrogen compound member 101 in the hydrogen storage state shown in the left-hand side of FIG. 2 is disposed in the container 102, subsequently, the inside of the container 102 is heated using the heating apparatus 103 so as to reach 150° C. or higher (preferably 150° C. or higher and 300° C. or lower), and the hydrogen compound member 101 is made to release hydrogen. The inside of the container 102 is heated by supplying the heating medium into the container 102. At the same time, the temperature of the heating medium is adjusted using the temperature adjustment means 103B in order to prevent the temperature from excessively rising. This makes the hydrogen compound member 101 lose some hydrogen and fall into the hydrogen release state shown in the right-hand side of FIG. 2.

Figure 5:
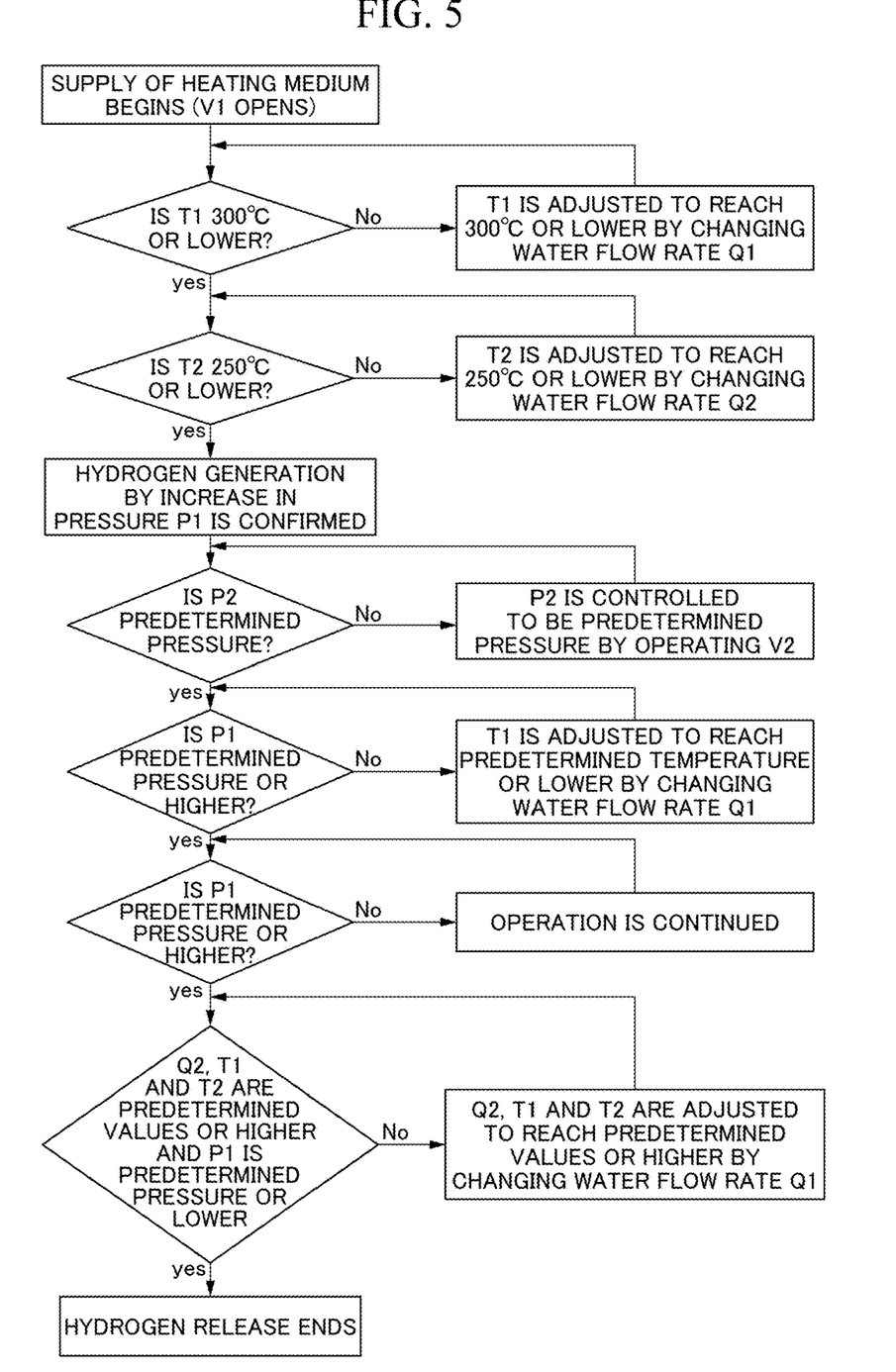
FIG. 5 is the flow of a process that is included in the hydrogen release step.

FIG. 5 shows the flow of a more detailed process that is included in an actual hydrogen release step. First, the supply of the heating medium is begun, and the temperature T1 of the inside of the container 102 on a side where the heating medium is disposed is controlled so as to become a temperature of 300° C. or lower. If the temperature exceeds 300° C., the temperature T1 is controlled so as to become 300° C. or lower by changing the flow rate of water Q1.

Next, the temperature T2 of the container 102 on a side where the heating medium is not disposed is controlled so as to become a temperature of 250° C. or lower. If the temperature exceeds 250° C., the temperature T2 is controlled so as to become 250° C. or lower by changing the heating medium amount of Q2.

Next, the pressure P1 in the container 102 is measured, and whether or not hydrogen is generated depending on an increase in pressure is confirmed. Whether or not the pressure P2 of hydrogen $H_2$ that is released from the container 102 is a predetermined pressure or higher is determined. In a case where the pressure P2 is lower than the predetermined pressure, the pressure P2 is controlled so as to reach the predetermined pressure by operating a valve V2.

Next, whether or not the pressure P1 in the container 102 is a predetermined pressure or higher is determined. In a case where the pressure P1 is lower than the predetermined pressure, the pressure P1 is controlled so as to reach the predetermined pressure by changing the flow rate of water Q1. Subsequently, whether or not the pressure P1 in the container 102 is the predetermined pressure or higher is determined. In a case where the pressure P1 is lower than the predetermined pressure, the same determination is repeated by continuing the operation.

Next, whether or not Q2, T1 and T2 are the predetermined values or higher and P1 is the predetermined pressure or lower, that is, a state where the release of $H_2$ is stopped has been formed in spite of the supply of heat is determined. In a case where these fail to satisfy the predetermined values, Q2, T1 and T2 are adjusted so as to reach the predetermined values or higher by changing the water flow rate Q1. In a case where these satisfy the predetermined values, the release of hydrogen is ended.

(Hydrogen Storage Step)

Figure 6:
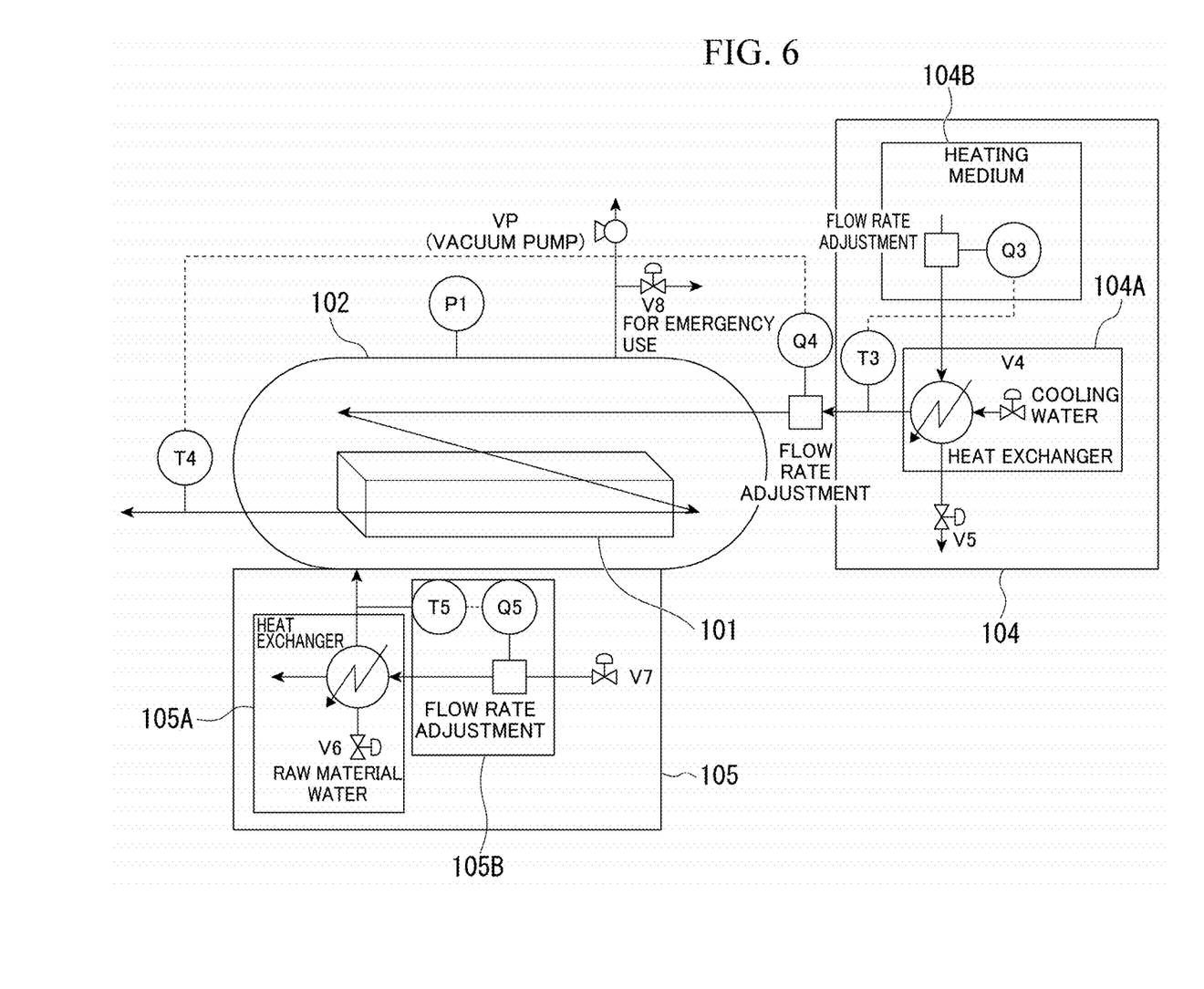
FIG. 6 is a view schematically showing the configuration of a facility that is used in a hydrogen storage step in a hydrogen release and storage method according to one embodiment of the present invention.

FIG. 6 is a view schematically showing the configuration of a facility that is used in a hydrogen storage step. The cooling apparatus 104 is composed of means for supplying a cooling water (cooling water supply means) 104A and means for adjusting the temperature of the cooling water (temperature adjustment means) 104B. In addition, the water supply apparatus 105 is composed of means for supplying a raw material water (raw material water supply means) 105A and means for adjusting the flow rate of the raw material water to be supplied (flow rate adjustment means) 105B. The heating apparatus 103 that is not used in this step is not shown.

Next, water is supplied into the container 102 while cooling the inside of the container 102 so as to reach lower than 150° C. (preferably 80° C. or higher and 150° C. or lower) using the cooling apparatus 104, and hydrogen is absorbed into the hydrogen compound member 101. Hydrogen thermally decomposed from the water due to the temperature in the container 102 bond to a non-bonding site of the hydrogen compound member 101, whereby the hydrogen compound member 101 returns to the hydrogen storage state shown on the left-hand side of FIG. 2.

When the hydrogen release step and the hydrogen absorption step are carried out alternately, it is possible to continuously supply hydrogen to predetermined facilities.

Figure 7:
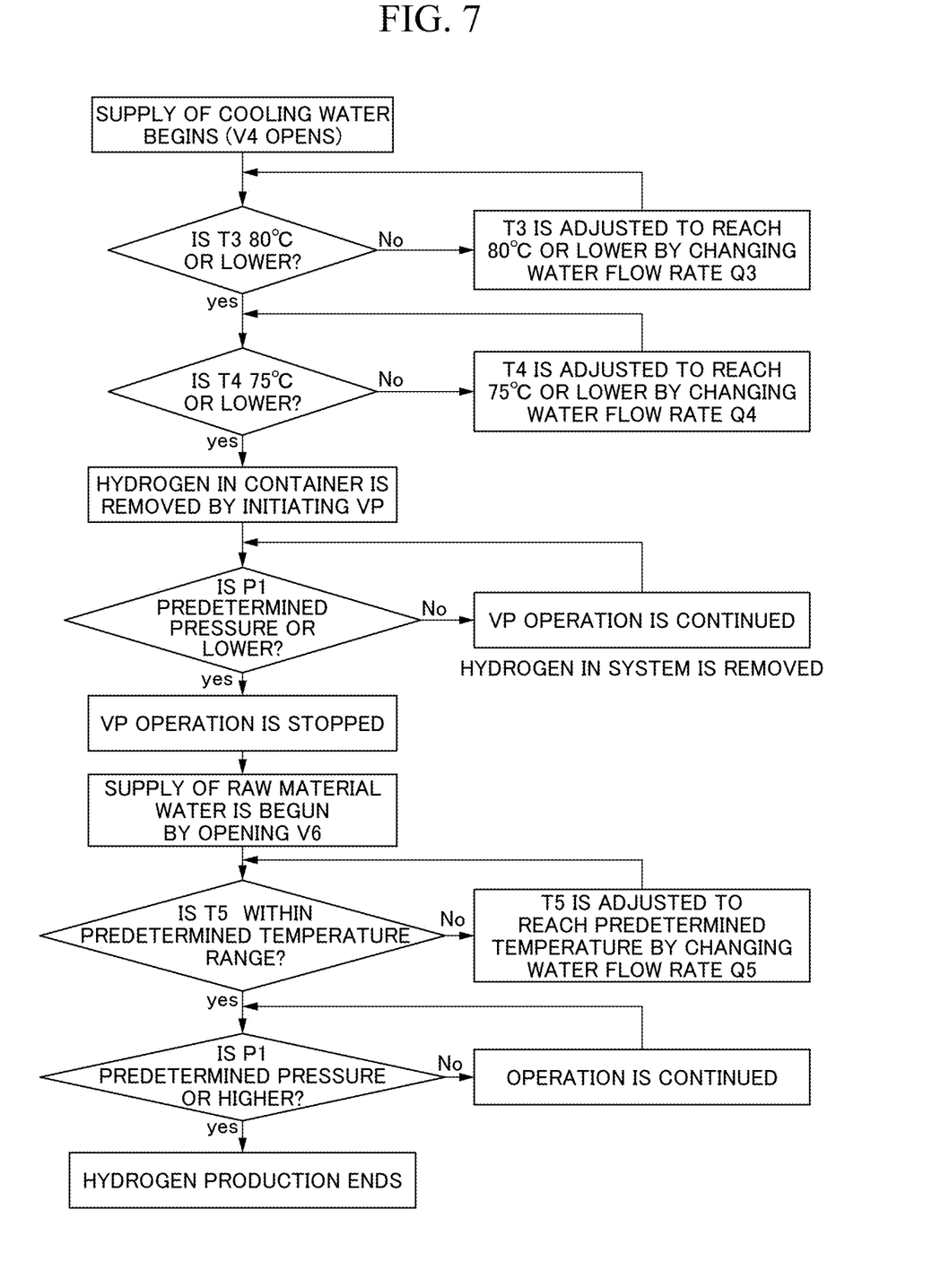
FIG. 7 is the flow of a process that is included in the hydrogen storage step.

FIG. 7 shows the flow of a more detailed process that is included in an actual hydrogen storage step. First, the supply of the cooling water is begun, and the temperature T3 of the inside of the container 102 on a side where the cooling water is disposed is controlled so as to become a temperature of 80° C. or lower. If the temperature exceeds 80° C., the temperature T1 is controlled so as to become 80° C. or lower by changing the water flow rate Q3.

Next, the temperature T4 of the container 102 on a side where the cooling water is not disposed is controlled so as to become a temperature of 75° C. or lower. If the temperature exceeds 75° C., the temperature T1 is controlled so as to become 75° C. or lower by changing the water flow rate Q4.

Next, hydrogen in the container 102 is removed by initiating VP. The operation of VP is continued until the pressure P1 reaches a predetermined pressure or lower, thereby removing hydrogen in the container 102.

Next, the operation of VP is stopped, and the supply of the raw material water is begun by opening V6. Next, the temperature of the raw material water is adjusted so as to be in a predetermined temperature range by changing the water flow rate Q5.

Next, whether or not the pressure P1 in the container is the predetermined pressure or higher is determined, and, in a case where the pressure P1 is lower than the predetermined pressure, the operation is continued until the pressure P1 reaches the predetermined pressure or higher. When the pressure P1 is the predetermined pressure or higher, the production of hydrogen is ended.

As described above, the hydrogen release and storage system 100 of the present embodiment can be used as a hydrogen supply source in a variety of apparatuses in which hydrogen is used as a raw material. Furthermore, since hydrogen can be generated without newly adding energy by using exhaust heat that is generated in the apparatuses to heat the hydrogen compound member 101 to generate hydrogen, it is possible to reduce the amount of natural gas used in association with the addition of energy.

Hereinafter, application examples of the hydrogen release and storage system 100 of the present embodiment will be listed.

Application Example 1

Figure 8:
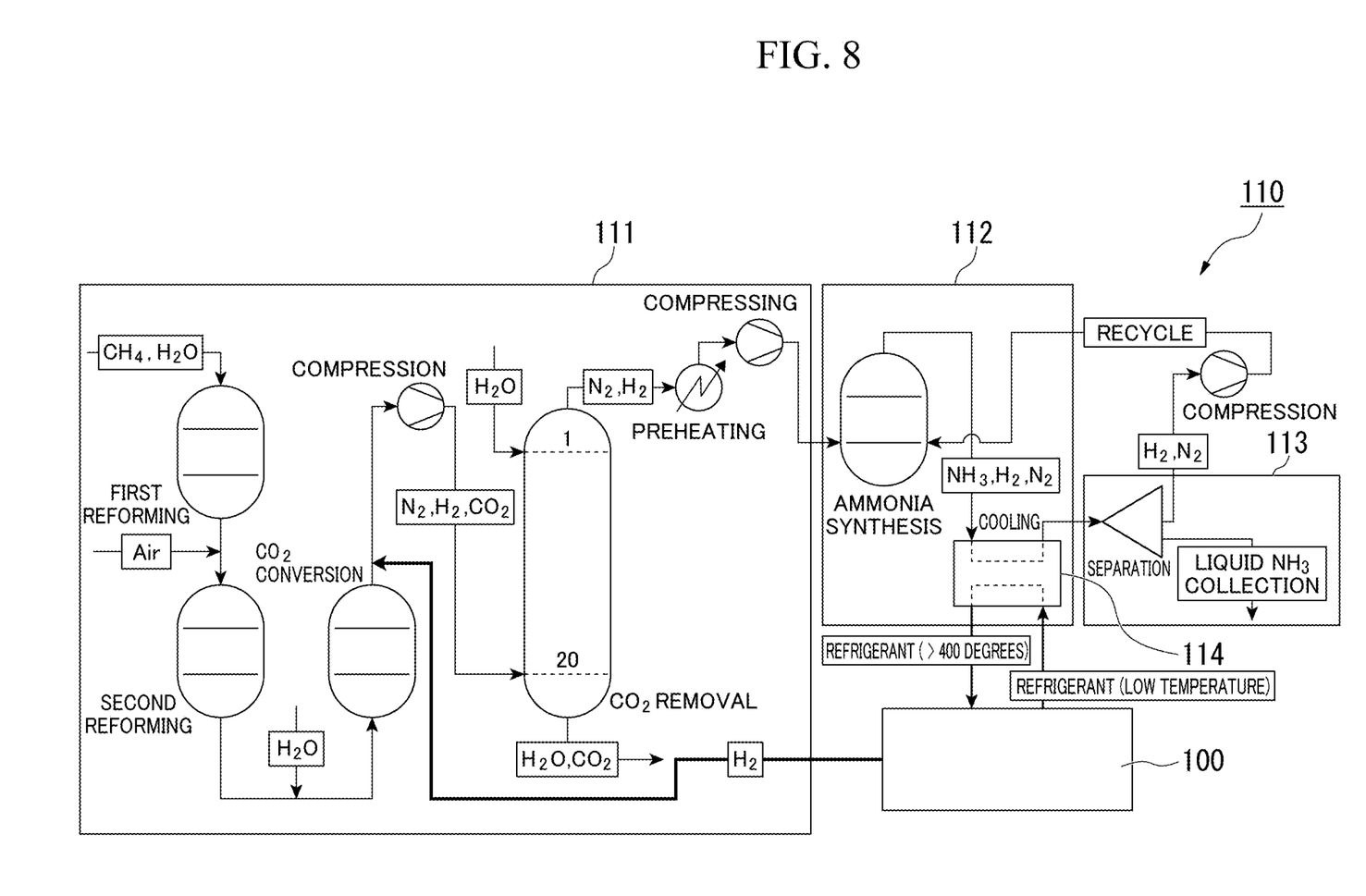
FIG. 8 is a view schematically showing the configuration of an ammonia production apparatus to which the hydrogen release and storage system is applied.

FIG. 8 is a view schematically showing the configuration of an ammonia production apparatus 110 to which the hydrogen release and storage system 100 is applied. The ammonia production apparatus 110 is mainly composed of a raw material preparation portion 111, an ammonia synthesis portion 112 and an ammonia collection portion 113. The heating apparatus and the cooling apparatus that configure the hydrogen release and storage system 100 can be made to function as a temperature adjustment apparatus 114 that adjusts the temperature of generated ammonia.

The use of exhaust heat having a medium temperature of approximately 400° C. that is generated in association with ammonia synthesis makes it possible to heat the hydrogen compound member 101 with no additional energy and to generate hydrogen. When the generated hydrogen is supplied at a predetermined timing of raw material preparation, it becomes possible to synthesize additional ammonia using this hydrogen as a raw material. This makes it possible to reduce the amount of a methane raw material that is injected as a raw material for ammonia synthesis.

Application Example 2

Figure 9:
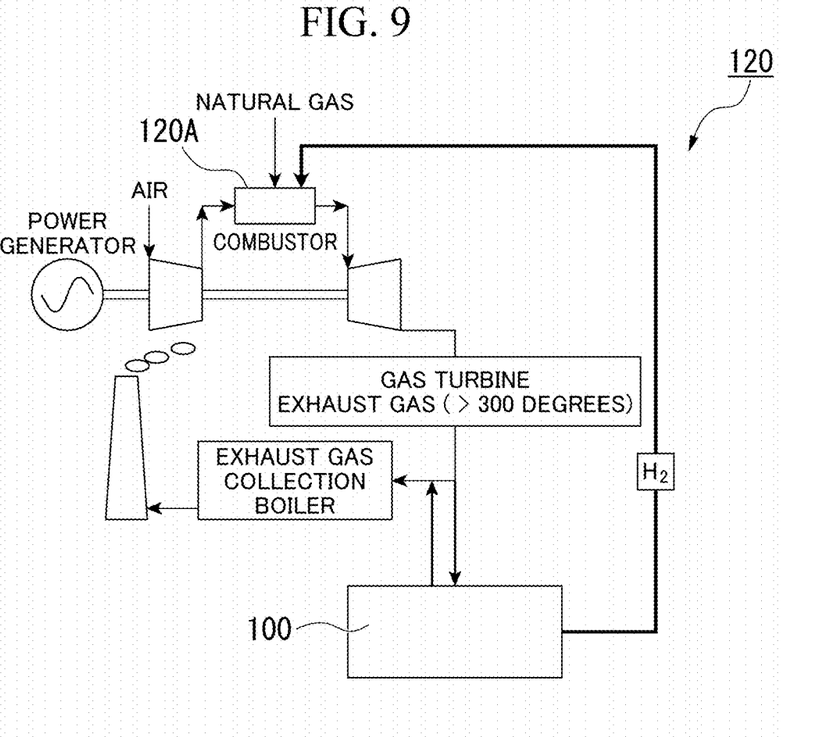
FIG. 9 is a view schematically showing the configuration of a gas turbine to which the hydrogen release and storage system is applied.

FIG. 9 is a view schematically showing the configuration of a gas turbine 120 to which the hydrogen release and storage system 100 is applied. The use of exhaust heat of approximately 300° C. that is generated in the gas turbine 120 makes it possible to heat the hydrogen compound member 101 with no additional energy and to generate hydrogen. When the generated hydrogen is supplied to a combustor 120A that configures the gas turbine 120, additional gas turbine combustion becomes possible using this hydrogen as a fuel. This makes it possible to reduce the amount of natural gas that is injected as a fuel for gas turbine combustion.

Application Example 3

Figure 10:
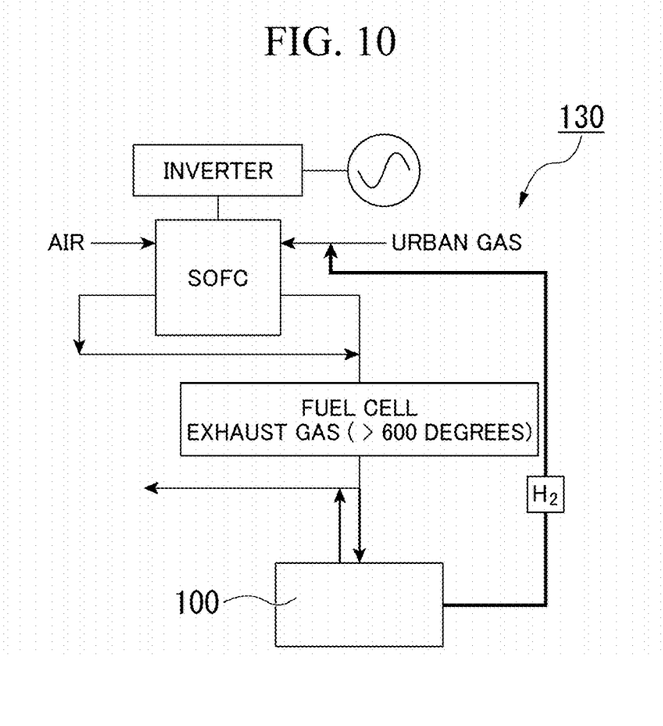
FIG. 10 is a view schematically showing the configuration of a fuel cell to which the hydrogen release and storage system is applied.

FIG. 10 is a view schematically showing the configuration of a solid oxide fuel cell (SOFC) 130 to which the hydrogen release and storage system 100 is applied. The use of exhaust heat of approximately 600° C. to 1200° C. that is generated in the production process of the fuel cell 130 makes it possible to heat the hydrogen compound member 101 with no additional energy and to generate hydrogen. When the generated hydrogen is supplied to the fuel cell 130, the hydrogen can be used as a fuel of the fuel cell. This makes it possible to reduce the amount of natural gas that is injected as a fuel of the fuel cell.

Application Example 4

Figure 11:
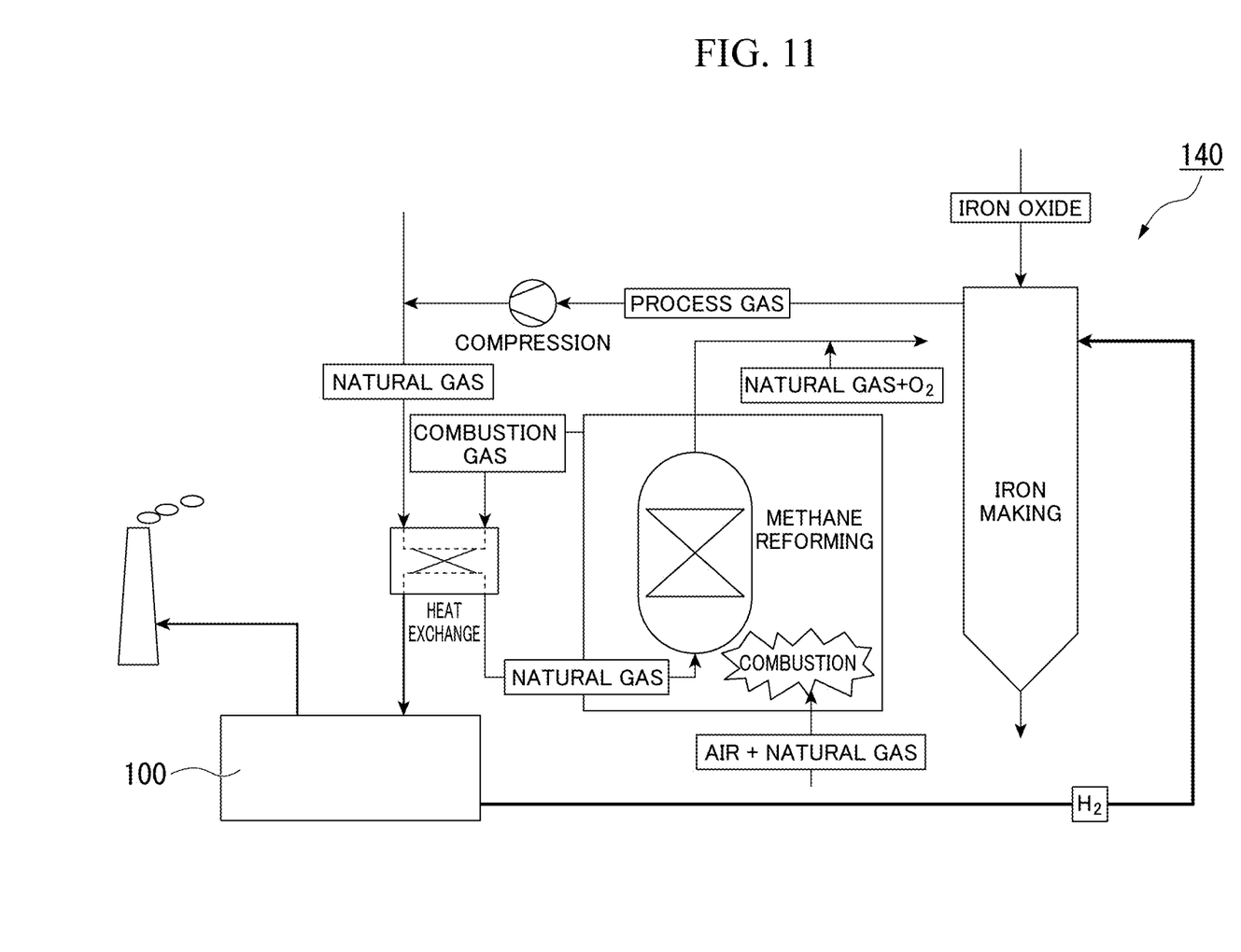
FIG. 11 is a view schematically showing the configuration of a steel mill to which the hydrogen release and storage system is applied.

FIG. 11 is a view schematically showing the configuration of a steel mill 140 to which the hydrogen release and storage system 100 is applied. The use of exhaust heat that is generated in an iron-making step makes it possible to heat the hydrogen compound member 101 with no additional energy and to generate hydrogen. The generated hydrogen can be used as a raw material for iron reduction for iron making ($Fe_2O_3+3H_2 \rightarrow 2Fe+3H_2O$). This makes it possible to reduce the amount of natural gas that is injected as a raw material for iron reduction.

REFERENCE SIGNS LIST

100 Hydrogen release and storage system
101 Hydrogen compound member
102 Container
103 Heating apparatus
103A Heating medium supply means
103B Temperature adjustment means
104 Cooling apparatus
104A Cooling water supply means
104B Temperature adjustment means
105 Water supply apparatus
105A Raw material water supply means
105B Flow rate adjustment means
106 Hydrogen release portion
107 Oxygen release portion
110 Ammonia production apparatus
111 Raw material preparation portion
112 Ammonia synthesis portion
113 Ammonia collection portion
114 Temperature adjustment apparatus
120 Gas turbine
120A Combustor
130 Fuel cell
140 Steel mill

What is claimed is:

1. A hydrogen release and storage system comprising:
    a hydrogen compound member;
    a container that accommodates the hydrogen compound member;
    a heating apparatus configured to heat an inside of the container;
    a cooling apparatus configured to cool the inside of the container,
    a water supply apparatus configured to supply water to the inside of the container, and
    a switching apparatus that switches between a first state and a second state,
    the first state is a state where the heating apparatus is driven and the cooling apparatus and the water supply apparatus are stopped and
    a second state is a state where the heating apparatus is stopped and the cooling apparatus and the water supply apparatus are driven.

2. The hydrogen release and storage system according to claim 1,
    wherein a stoichiometric ratio between an element other than a hydrogen element that configures the hydrogen compound member and the hydrogen element is 1:1 to 3:4.

3. The hydrogen release and storage system according to claim 2,
    wherein an element other than the hydrogen element is boron.

4. An ammonia production apparatus comprising:
    the hydrogen release and storage system according to claim 1 as a hydrogen supply source.

5. A gas turbine comprising:
    the hydrogen release and storage system according to claim 1 as a hydrogen supply source.

6. A fuel cell comprising:
    the hydrogen release and storage system according to claim 1 as a hydrogen supply source.

7. A steel mill comprising:
    the hydrogen release and storage system according to claim 1 as a hydrogen supply source.

8. A hydrogen release and storage method in which the hydrogen release and storage system according to claim 1 is used as a hydrogen supply source, the method alternately comprising:
    a hydrogen release step of heating the inside of the container so as to reach 150° C. or higher and releasing hydrogen from the hydrogen compound member, and
    a hydrogen absorption step of supplying water to the inside of the container while cooling the inside of the container so as to reach lower than 150° C. and absorbing the hydrogen into the hydrogen compound member.

9. The hydrogen release and storage method according to claim 8,
    wherein the inside of the container is cooled so as to reach 80° C. or higher and lower than 150° C. in the hydrogen absorption step.

* * * * *